United States Patent [19]

Moriguchi et al.

[11] 4,399,444
[45] Aug. 16, 1983

[54] HEAT-SENSITIVE RECORDING HEAD

[75] Inventors: Haruhiko Moriguchi; Takashi Ohmori, both of Kanagawa, Japan

[73] Assignee: Fuji Xerox Co., Ltd., Tokyo, Japan

[21] Appl. No.: 331,352

[22] Filed: Dec. 16, 1981

[30] Foreign Application Priority Data

Dec. 19, 1980 [JP] Japan .................................. 55-178920

[51] Int. Cl.³ ............................................ G01D 15/10
[52] U.S. Cl. .................. 346/76 PH; 219/216
[58] Field of Search .................. 346/76 PH; 400/120; 219/216

[56] References Cited

U.S. PATENT DOCUMENTS

| 3,139,026 | 6/1964 | Meckstroth | 219/216 |
| 3,145,071 | 8/1944 | Vance | 346/76 PH |
| 3,161,457 | 12/1964 | Schroeder | 346/76 PH |
| 4,099,046 | 6/1978 | Boynton | 219/216 |
| 4,136,274 | 1/1979 | Shibata | 346/76 PH |

Primary Examiner—Michael L. Gellner
Assistant Examiner—Todd DeBoer
Attorney, Agent, or Firm—Sughrue, Mion, Zinn, Macpeak and Seas

[57] ABSTRACT

A thermal recording head is formed by alternately laminating conductive and insulating layers and then disposing a heat generating resistive element along a side surface of the laminated body in contact with each conducting layer and extending in a direction transverse to the planes of the laminating layers.

8 Claims, 9 Drawing Figures

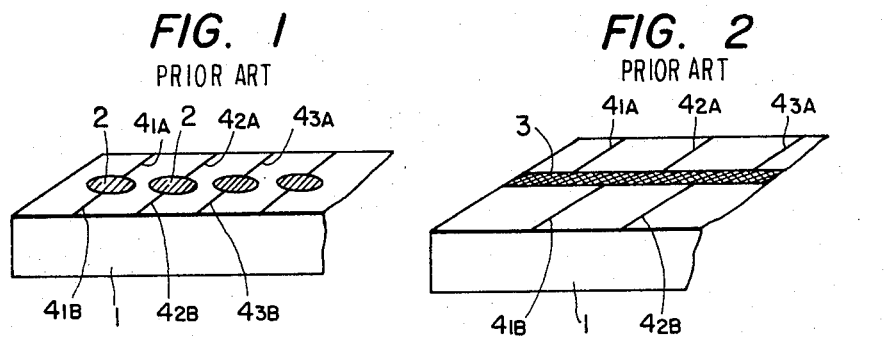
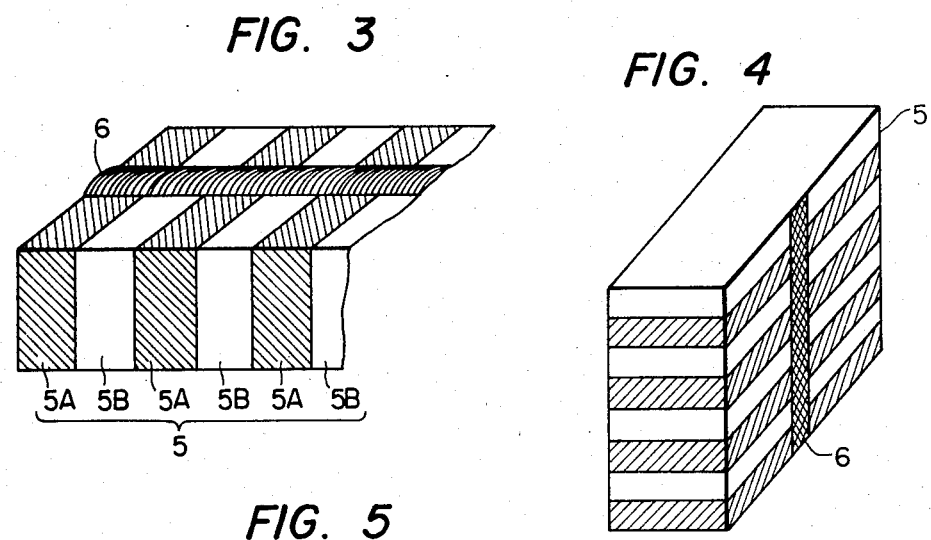
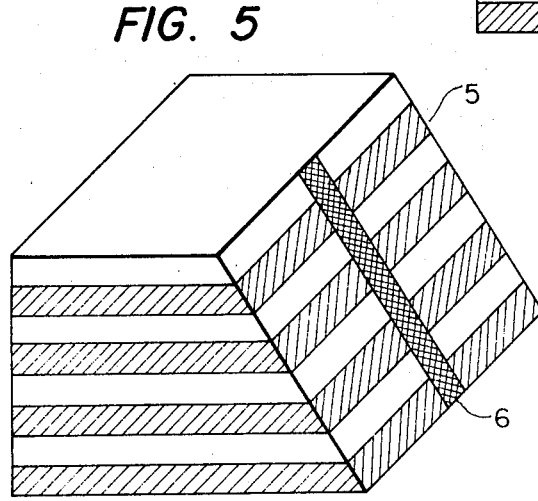

HEAT-SENSITIVE RECORDING HEAD

BACKGROUND OF THE INVENTION

This invention relates to a heat-sensitive recording head employed in a heat-sensitive recording apparatus.

As shown in FIG. 1 or 2, in a conventional heat-sensitive recording head, a number of individual heat generating resistors 2 are arranged in one line on an insulating substrate 1, or a piece of thin heat generating resistor 3 is disposed on the insulating substrate 1. Pairs of lead electrodes $4_{1A}$ and $4_{1B}$, $4_{2A}$ and $4_{2B}$, ... are arranged on both sides of the heat generating resistors 2 or the heat generating resistor 3 and are electrically connected to the latter 2 or 3. When voltage is applied to the pair of lead electrodes, the heat generating resistors 2 or the heat generating resistor 3 generate heat selectively, and information can be thermally recorded on a recording sheet in contact with the heat generating resistors 2 or the heat generating resistor 3.

In order to increase the resolution of the above-described heat-sensitive recording head, it is essential to arrange the heat generating resistors 2 or the heat generating resistor 3 and the lead electrodes 4 on the insulating substrate 1 with high density and with high accuracy. Therefore, it has heretofore been considerably difficult to manufacture a heat-sensitive recording head with high resolution, and the manufactured heat-sensitive recording head is considerably expensive.

SUMMARY OF THE INVENTION

In view of the foregoing, an object of this invention is to provide a heat-sensitive recording head which is high in resolution and quality and it yet low in manufacturing cost.

The foregoing object of the invention has been achieved by the provision of a heat-sensitive recording head which, according to this invention, comprises a laminated body formed by alternately laminating a number of insulating layers and a number of conducting layers in parallel with one another by vacuum evaporation or the like, the laminated body having a cut surface which is obtained by cutting the laminated body along a plane which is not in parallel with the layers of the laminated body; and a thin piece of heat generating resistor arranged on the cut surface in such a manner that it is in contact with the end faces of the conducting layers.

BRIEF DESCRIPTION OF THE DRAWINGS

This invention will be described with reference to the following drawings, in which:

FIGS. 1 and 2 are perspective views showing examples of a conventional heat-sensitive recording head;

FIG. 3 is a perspective view showing one example of a heat-sensitive recording head according to this invention;

FIGS. 4 and 5 are perspective views for a description of how the resolution of the heat-sensitive recording heads can be varied using the same laminated body;

DETAILED DESCRIPTION OF THE INVENTION

FIG. 3 gives an outline of the arrangement of a heat-sensitive recording head according to this invention. The heat-sensitive recording head comprises a laminated body 5 and a heat generating resistor 6 arranged along a substantially central line on one surface of the laminated body 5. The laminated body 5 is formed by alternately laminating a number of aluminum layers (conducting layers) 5A and a number of magnesium fluoride layers (insulating layers) 5B by vacuum evaporation. Each of these layers is about 0.06 mm in thickness. Screen printing is employed to form the heat generating resistor 6 on one of the surfaces which are formed by cutting the laminated body 5 perpendicularly to a plane in parallel with the layers forming the laminated body 5. Therefore, the heat generating resistor 6 is perpendicular to the end faces of the layers which appear in the cut surface. When voltage is selectively applied to the heat-sensitive recording head thus formed, with pairs of aluminum layers 5A acting as lead electrodes and separated by the respective magnesium fluoride layers 5B, then current flows in the portions of the heat generating resistor 6 which are electrically connected to the aluminum layers to which the voltage is applied, as a result of which such portions of the resistor 6 generate heat. Therefore, if a recording sheet is brought in contact with the heat generating resistor 6, heat-sensitive recording can be carried out.

The heat-sensitive recording head of the invention is made of a laminated body which is formed by alternately laminating the conducting layers and the insulating layers by vacuum evaporation. Therefore, each of the layers can be made extremely thin with high accuracy, and a variety of heat-sensitive recording heads of different resolutions can be made of one laminated body. That is, if the heat generating resistor 6 is arranged on the cut surface which is perpendicular to a plane in parallel with the layers of the laminated body 5 as shown in FIG. 4, the heat-sensitive recording head is of highest resolution. On the other hand, where the heat generating resistor 6 is arranged on a cut surface which is not perpendicular to a plane parallel to the layers of the laminated body 5 as shown in FIG. 5, then the resolution of the heat-sensitive recording head will differ according to the angle of inclination of the cut surfaces.

Figure 6:
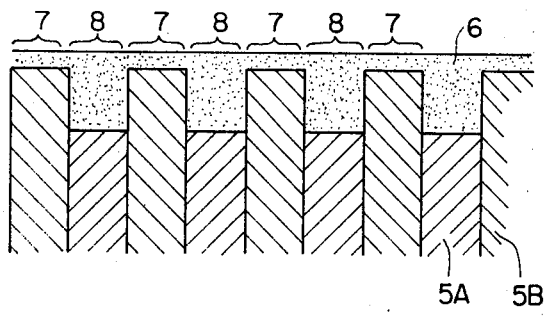
FIG. 6 is a sectional view showing another example of the heat-sensitive recording head according to the invention, in which the heat generating regions are smaller in thickness than the other regions.
Figure 7:
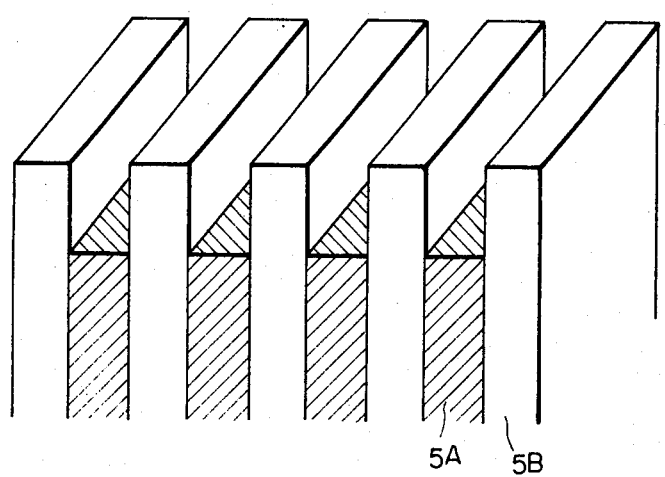
FIG. 7 is an explanatory diagram showing one step in the manufacturing of the heat-sensitive recording head shown in FIG. 6.
Figure 8:
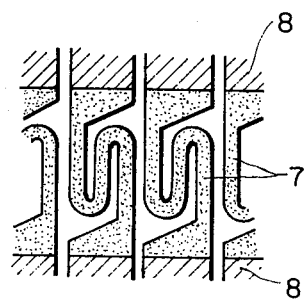
FIG. 8 is a plan view showing a meander type heat generating resistor.

FIG. 6 is a sectional view showing another example of the heat-sensitive recording head according to this invention, in which the heat generating regions of the heat generating resistor are made thinner. The heat-sensitive recording head is formed according to a method in which, after the cut surface of the laminated body is subjected to etching to decay only the aluminum layers 5A as shown in FIG. 7, the heat generating resistor 6 is formed on the cut surface thus treated. In the heat-sensitive recording head, similarly as in a meander type heat generating resistor shown in FIG. 8, the current density in the heat generating regions 7 is higher than that in the other regions 8, and therefore heat is generated at suitable and correct positions. Furthermore, the resistance between adjacent aluminum layers (electrodes) 5A can be increased, and therefore a sufficiently large amount of heat can be obtained with small drive current.

Figure 9:
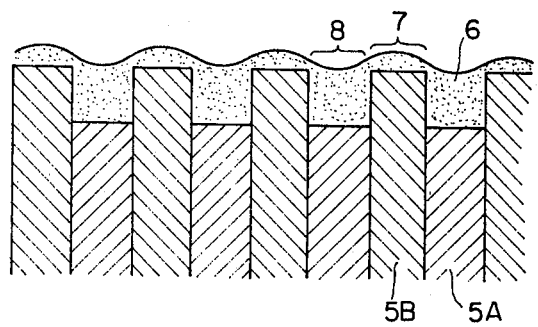
FIG. 9 is a sectional view showing one modification of the heat-sensitive recording head shown in FIG. 6.

FIG. 9 shows one modification of the heat-sensitive recording head shown in FIG. 6. In this modification, the heat generating region 7 on each magnesium fluoride layer 5B is of a convex form. Therefore, the heat-sensitive recording head can satisfactorily contact a recording sheet, so that the heat-sensitive recording efficiency is considerably high.

As is apparent from the above description, according to this invention, a number of heat-sensitive recording heads can be made by cutting the laminated body which is obtained by alternately laminating the conducting layers and the insulating layers and then placing a resistive element across the body in contact with the layers. Therefore, heat-sensitive recording heads stable in quality can be manufactured at low cost according to this invention.

In the above-described embodiments, the heat generating resistor or resistors are brought into direct contact with a heat-sensitive recording sheet; however, it goes without saying that the heat generating resistor may be covered with a wear resisting layer such as a glass layer.

Further, in the above-described embodiments, the conducting layers and the insulating layers are of equal thickness. However, in general, it is preferable that each insulating layer have a greater thickness than each conducting layer, in order to relatively increase the heat generating regions.

Still further, in the above-described embodiments, the conducting layers are made of aluminum, and the insulating layers are made of magnesium fluoride. However, it goes without saying that the former may be made of other electrically conductive materials such as, for instance, gold and the latter may be made of other insulating materials such as, for instance, silicon dioxide.

What is claimed is:

1. A thermal recording head of the type including at least one resistive element having first and second electrodes connected thereto for providing current through said resistive element to thereby generate heat, said recording head comprising conductive and insulating layers alternately laminated by a chemical vapor deposition process, or the like, to form a laminated body, said laminated body having a side surface extending in a direction not parallel to the planes of said layers; and said resistive element comprising a resistive material extending along said side surface and in contact with each of said conductive layers.

2. A thermal recording head as claimed in claim 1, wherein said side surface extends at an oblique angle with respect to a line perpendicular to the planes of said layers.

3. A thermal recording head as claimed in claim 1, wherein said side surface is perpendicular to said layers.

4. A thermal recording head as claimed in claim 1, wherein said conductive layers are recessed from said side surface.

5. A thermal recording head as claimed in claim 1, wherein said resistive material as it crosses each insulating layer has a substantially convex surface facing away from said laminated body.

6. A thermal recording head of the type including at least one resistive element having first and second electrodes connected thereto for providing current through said resistive element to thereby generate heat, said recording head comprising a laminated body of alternately laminated and substantially planar insulating and conductive layers, said laminated body having a side surface extending at an oblique angle with respect to a line perpendicular to the planes of said layers, and a resistive material as said resistive element extending along said side surface and in contact with each of said conductive layers.

7. A thermal recording head of the type including at least one resistive element having first and second electrodes connected thereto for providing current through said resistive element to thereby generate heat, said recording head comprising a laminated body formed of alternately laminated and substantially planar insulating and conductive layers, said laminated body having a side surface extending in a direction not parallel to the planes of said layers, said conductive layers being recessed from said side surface, and a resistive material as said resistive element extending along said side surface and in contact with each of said recessed conductive layers.

8. A thermal recording head of the type including at least one resistive element having first and second electrodes connected thereto for providing current through said resistive element to thereby generate heat, said recording head comprising a laminated body formed of alternately laminated and substantially planar insulating and conductive layers, said laminated body having a side surface extending in a direction not parallel to the planes of said layers, and a resistive material as said resistive element extending along said side surface and in contact with each of said conductive layers, said resistive material as it crosses each said insulating layer extending further away from said side surface of said laminated body than in portions of said resistive material between said insulating layers, whereby said resistive material has a substantially convex surface facing away from said laminated body.

* * * * *